P. FORSCHLER.
MOTOR VEHICLE.
APPLICATION FILED NOV. 14, 1914.

1,154,500.

Patented Sept. 21, 1915.
4 SHEETS—SHEET 3.

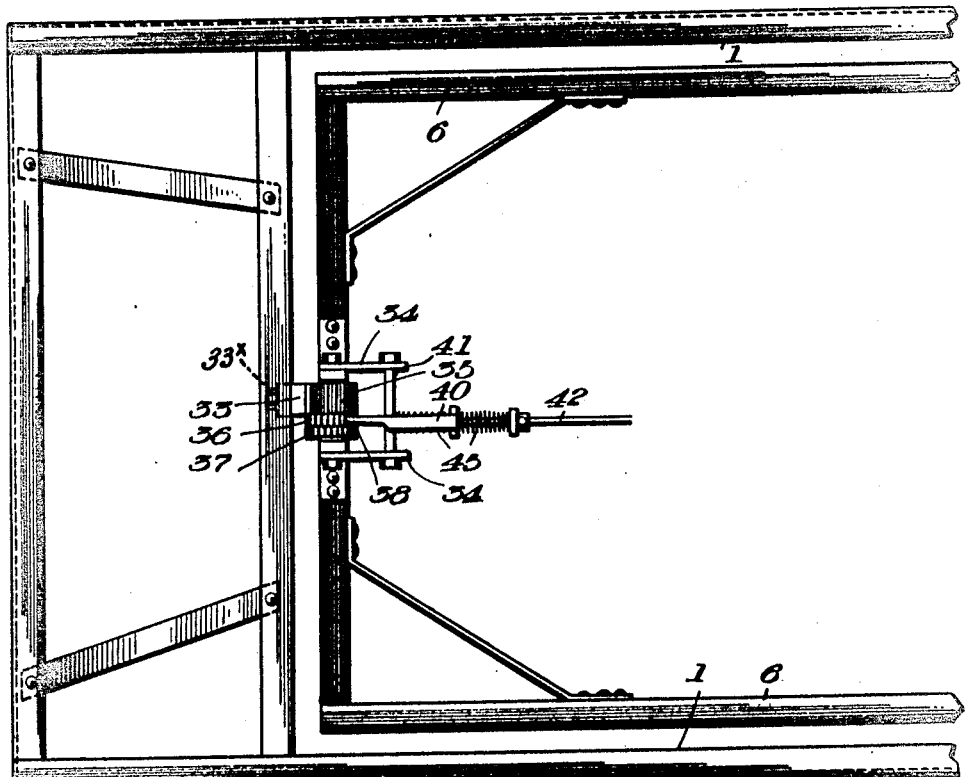

UNITED STATES PATENT OFFICE.

PHILIP FORSCHLER, OF NEW ORLEANS, LOUISIANA, ASSIGNOR TO PHILIP FORSCHLER WAGON AND MANUFACTURING COMPANY, OF NEW ORLEANS, LOUISIANA.

MOTOR-VEHICLE.

1,154,500.  Specification of Letters Patent.  Patented Sept. 21, 1915.

Application filed November 14, 1914.  Serial No. 872,137.

*To all whom it may concern:*

Be it known that I, PHILIP FORSCHLER, citizen of the United States, residing at New Orleans, in the parish of Orleans and State of Louisiana, have invented new and useful Improvements in Motor-Vehicles, of which the following is a specification.

My present invention relates to motor vehicles; and it has for one of its objects to provide a motor vehicle embodying a spring-supported frame for the body and load and a spring-supported frame for the motor and its appurtenances, the driving connections, the steering gear and the driver's seat, the said frames being independently connected with the axles, and consequently adapted to move vertically each independently of the other, whereby the motor and other parts carried by the second-named frame are relieved of shock and jar when the body or first-named frame is light or without load and the vehicle is passing over a rough road.

Another object of the invention is the provision of simple, durable and efficient means for holding the frames against lateral or sidewise movement relative to each other without interfering with the independent up and down movement of the frame.

Another object is the provision of means whereby both frames can be locked together by the driver so as to start the truck on the heavy springs, and then after the truck is in motion the driver is enabled on shifting to the next speed to render each frame capable of movement independently of the other frame.

Figure 1:
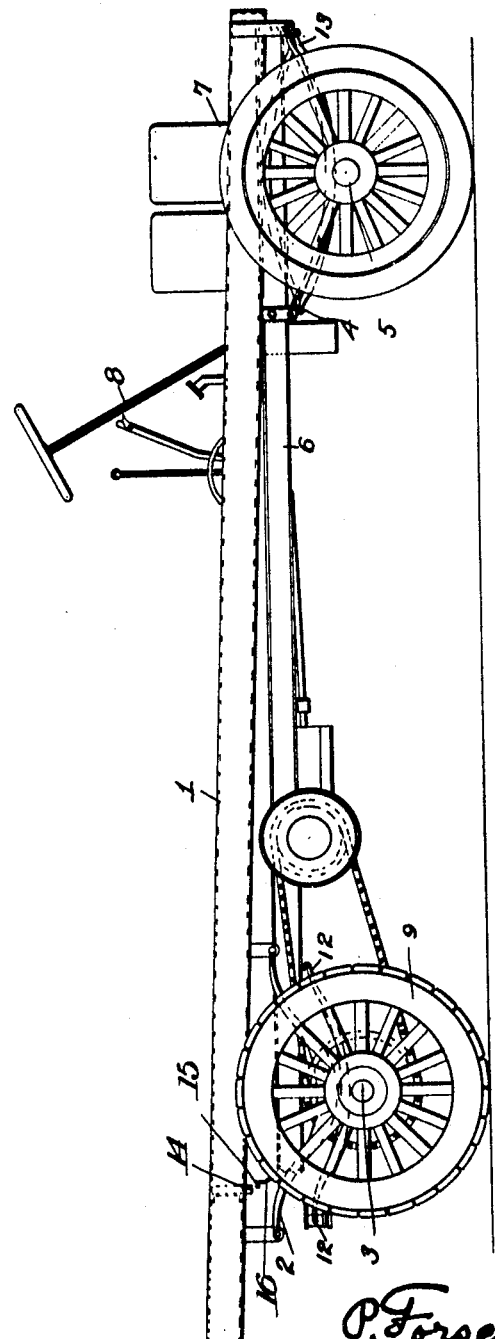
Figure 2:
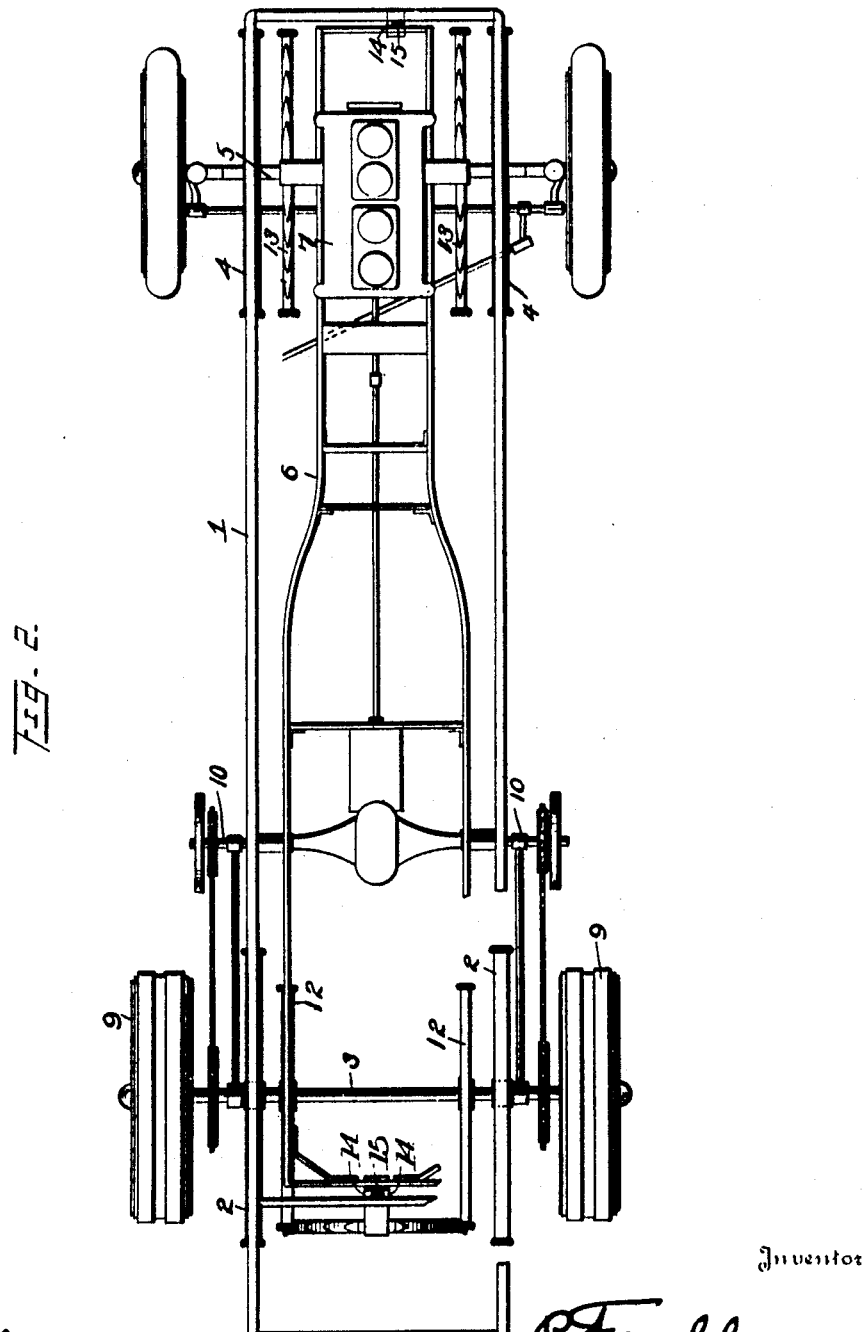
Figure 3:
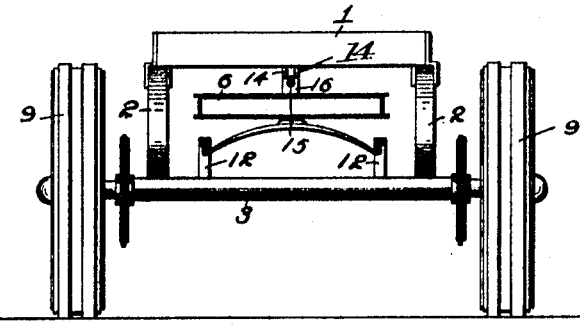
Figure 4:
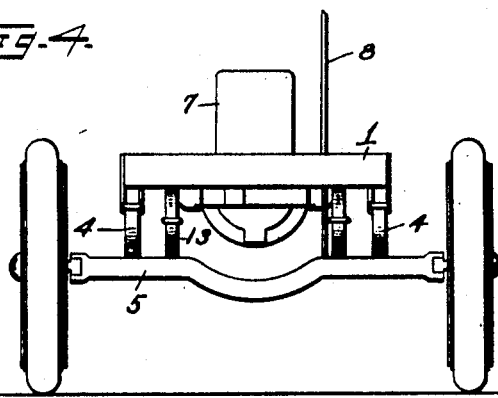
Figure 5:
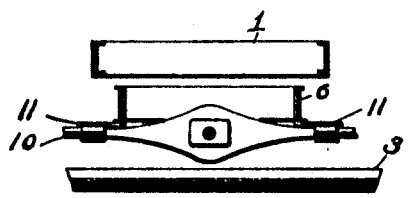

Other advantageous characteristics of the invention will be fully understood from the following description and claims when the same are read in connection with the drawings, accompanying and forming part of this specification, in which:

Figure 1 is a side elevation of so much of a motor vehicle as is necessary to show the preferred embodiment of my invention. Fig. 2 is a plan of the same. Fig. 3 is a rear elevation. Fig. 4 is a front elevation. Fig. 5 is a detail view illustrative of the manner of connecting the "jack" shaft of the driving connections with the motor-carrying frame. Fig. 6 is a detail plan of the locking mechanism. Fig. 7 is a detail longitudinal section of the same. Figs. 8 and 9 show the two ratchets.

Similar numerals of reference designate corresponding parts in all of the views of the drawings.

In the present and preferred embodiment of my invention, an outer frame 1 is provided to carry a body (not shown), or any other load that may be imposed upon it. The said frame 1 is connected through springs 2 with a rear axle 3, and through springs 4 with a front axle 5.

Arranged within the frame 1 is a frame 6 by which is carried a motor 7 and its appurtenances, a steering shaft 8, and the driving connections between the motor and the rear wheels 9, which connections include a "jack" shaft 10, connected through brackets 11 with the frame, as clearly shown in Fig. 5. The inner frame 6 is supported by rear springs 12 and forward springs 13, and is connected by the springs 12 with the rear axle 3, and by the springs 13 with the forward axle 5. The springs 12 and 13 complementary to the inner frame 6 are preferably soft-riding springs, though I do not desire to be understood as confining myself to elliptic, semi-elliptic, quarter elliptic, platform or any other specific type or types of springs for supporting said inner frame.

The spring connection and support of the inner frame 6 being independent of the spring connection and support of the outer frame 1, it will be manifest that the outer frame 1 is free to move up and down independently of the inner frame 6 and the elements, including the motor, carried by the latter. From this it follows that movements of the outer frame 1 (particularly when it is unloaded and the machine is traveling over rough roads), will not affect the easy riding of the inner frame 6; also, that when the outer frame 1 is overloaded or heavily loaded, or is struck in a collision or other accident, no injury whatever will result to the inner frame 6 and the motor and other elements carried by the same.

With a view to guiding the frames 1 and 6 in their independent vertical movements, and preventing lateral or sidewise play of said frames incidental to the upward and downward movements thereof, I provide the forward and rear guides and retainers illustrated. The said guides and retainers respectively comprise vertically disposed spaced bars or members 14 and a male member 15, preferably an anti-friction roller, movable vertically between and held against lateral deflection by the spaced bars or members. The preferred arrangement at the back is to have the spaced members 14 fixed with respect to the outer frame 1, and the male member or anti-friction roller 15 mounted on an upright 16 that is fixed to and extends upwardly from the frame 6. At the front and because of the forward end of the frame 6 being higher than the rear end thereof, the male member or anti-friction roller 15 is mounted on a projection that extends from the forward cross-bar of the frame 6.

As best shown in Figs. 6 and 7 the frame 1 is provided on its rear cross-bar with an upright rack bar 33, and fixed to and extending upwardly from the rear cross-bar of the frame 6 is a bifurcated bracket 34 between the arms of which is mounted a spur gear 35, intermeshed with the rack bar 33. Fixed to the said spur gear 35 and arranged at one side thereof are two reversely arranged ratchets 36 and 37. These are designed to be engaged by the dogs 38 and 39, respectively, said dogs being carried by a lever 40, fulcrumed at 41 on the bracket 34. The depending arm, of said lever 40 is apertured to receive a longitudinal rod 42 and this rod is provided in front and rear of the lever with abutments 43 and 44, respectively, between which and the lever coiled springs 45 are interposed as shown. The rod 42 is designed to be connected with a conventional or any other approved control lever (not shown) so that when the driver of the truck throws the lever in for either speed, forward or reverse he moves the lever 40 and thereby locks the gear 35 against rotation and also locks both frames 1 and 6 together. Thus the truck is started on the heavy springs, and then after the truck is in motion and the driver shifts to the next speed, the lever 40 is moved to release the spur gear 35 and thereby render the frames 1 and 6 free to move independently of each other. The rack bar 33 is connected with the frame 1 through the medium of a swivel bolt 33ˣ, and hence the said frame may shift to various angles without affecting the intermeshing of the said rack bar with the spur gear 35. The connection intermediate the rod 42 and the control lever may be of any character compatible with the purpose of my invention. It is desirable, however, that the connection be of such character that when the upper arm of the control or gear-shifting lever is drawn backwardly toward the driver's seat to shift the gears to low speed, the rod 42 will be moved rearwardly, and the lower dog 39 on lever 40 will be placed in engagement with the ratchet 37. This prevents upward movement of the inner frame 6 with respect to the outer frame 1. It is also desirable that the connection be such that when the upper arm of the control lever is moved forwardly for intermediate speed or for high speed, as the case may be, the lever 40 will be moved to such position that neither of its dogs engages the ratchets. This will leave both frames 1 and 6 free to move with respect to the other. When the upper arm of the control lever is moved forwardly or away from the driver's seat and beyond the vertical to reverse, the rod 42 will be moved forwardly and the dog 38 will be engaged with its complementary ratchet 36. This prevents downward movement of the inner frame 6 with respect to the outer frame 1. It will be gathered from the foregoing that the only times that the lever 40 engages the ratchet 36 and 37 is when the vehicle is started forwardly or is started backwardly.

Having described my invention, what I claim and desire to secure by Letters-Patent, is:

1. The combination in a motor vehicle, of front and rear axles, a load-carrying frame, a motor-carrying frame; said frames being movable vertically, each independently of the other, and the motor-carrying frame being arranged within the load-carrying frame and extending rearwardly below the same, spring connections between the load-carrying frame and the axles, other spring connections between the motor-carrying frame and the axles, and rear and front retainers and guides respectively comprising vertically-disposed spaced members connected with one frame and an anti-friction roller movable between said spaced members and carried by the other frame.

2. The combination in a motor vehicle, of front and rear axles, a load-carrying frame, a motor-carrying frame: said frames being movable vertically, each independently of the other, and the motor-carrying frame being arranged within the load-carrying frame and extending rearwardly below the same, spring connections between the load-carrying frame and the axles, other spring connections between the motor-carrying frame and the axles, and rear and forward devices for guiding and retaining the frames against lateral deflection or play incidental to the upward and downward movements of said frames.

3. The combination in a motor vehicle, of front and rear axles, a load-carrying frame, a motor-carrying frame; said frames being yieldingly supported on the axles and movable independently each of the other, and manually operated means constructed and arranged on one movement thereof to lock the frames together and on another movement to render the frames free to move independently each of the other.

4. The combination in a motor vehicle, of front and rear axles, a load-carrying frame, a motor-carrying frame; said frames being yieldingly supported on the axles and movable independently each of the other, a rack carried by one frame, a spur gear intermeshed with said rack and carried by the other frame and having ratchets, dogs also carried by said frame and arranged to coöperate with the ratchets, and means for operating said dogs.

5. The combination in a motor vehicle, of front and rear axles, a load-carrying frame, a motor-carrying frame; said frames being yieldingly supported on the axles and movable independently each of the other, a rack carried by one frame, a spur gear intermeshed with said rack and carried by the other frame and having ratchets, a lever mounted on said frame and having dogs arranged to coöperate with the ratchets, a rod extending through the lever, and springs interposed between the lever and abutments on the rod.

In testimony whereof I have hereunto set my hand in presence of two subscribing witnesses.

PHILIP FORSCHLER.

Witnesses:
J. AUG. MASCHEK,
A. L. FORSCHLER.

Copies of this patent may be obtained for five cents each, by addressing the "Commissioner of Patents, Washington, D. C."